US007386737B2

(12) United States Patent
Finkelstein et al.

(10) Patent No.: US 7,386,737 B2
(45) Date of Patent: Jun. 10, 2008

(54) METHOD AND APPARATUS TO CONTROL TEMPERATURE OF PROCESSOR

(75) Inventors: Lev Finkelstein, Netanya (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 10/978,362

(22) Filed: Nov. 2, 2004

(65) Prior Publication Data

US 2006/0095798 A1    May 4, 2006

(51) Int. Cl.
*G06F 1/00*    (2006.01)
(52) U.S. Cl. ...................................... 713/300
(58) Field of Classification Search ............... None
See application file for complete search history.

(56) References Cited

U.S. PATENT DOCUMENTS

| 5,590,061 | A | 12/1996 | Hollowell, II et al. | |
| 5,996,084 | A * | 11/1999 | Watts | 713/323 |
| 6,336,080 | B1 * | 1/2002 | Atkinson | 702/132 |
| 6,535,798 | B1 * | 3/2003 | Bhatia et al. | 700/293 |
| 6,885,233 | B2 | 4/2005 | Huard et al. | |
| 7,085,945 | B2 * | 8/2006 | Silvester | 713/320 |
| 2002/0087896 | A1 | 7/2002 | Cline et al. | |
| 2003/0206060 | A1 | 11/2003 | Suzuki | |
| 2004/0215988 | A1 | 10/2004 | Clabes et al. | |
| 2005/0088137 | A1 | 4/2005 | Cohen et al. | |
| 2006/0020831 | A1 * | 1/2006 | Golla et al. | 713/300 |

FOREIGN PATENT DOCUMENTS

| EP | 0 699 992 | 3/1996 |
| EP | 0 712 064 | 5/1996 |
| TW | 200400693 | 1/2004 |
| WO | WO 98/13935 | 4/1998 |
| WO | WO 03/050663 | 6/2003 |

OTHER PUBLICATIONS

International Search Report for PCT/US2005/034997, mailed on Mar. 23, 2006.
Intel Speedstep Technology Backgrounder, "Mobile Pentium III Processors Featuring Intel SpeedstepTechnology-Desktop-Class Performance And Low Power For Longer Battery Life", pp. 1-3.
Skadron et al., "Control-Theoretic Techniques and Thermal-RC Modeling for Accurate and Localized Dynamic Thermal Management", Published in the Proceedings of the Eighth International Symposium on High-Performance Computer Architecture (HPCA'02), 2002, IEEE, pp. 1-12.
Skadron et al., "Temperature-Aware Microarchitecture", Published in the Proceedings of the 30th International Symposium on Computer Architecture, Jun. 9-11, 2003, San Diego, CA, USA, IEEE, pp. 1-12.
Office Action dated Jan. 8, 2008 for Taiwan Patent Application No. 94134334; Application Date Sep. 30, 2005.

* cited by examiner

*Primary Examiner*—Rehana Perveen
*Assistant Examiner*—Mohammed H Rehman
(74) *Attorney, Agent, or Firm*—Pearl Cohen Zedek Latzer, LLP

(57) ABSTRACT

Briefly, a method to control a temperature of a processor and a processor that includes a thermal controller to control a temperature. The thermal controller may decrease the power level of the processor to a first power level for a first predetermined time period and may vary the power of the processor to a second power level for a second predetermined time period.

31 Claims, 3 Drawing Sheets

METHOD AND APPARATUS TO CONTROL TEMPERATURE OF PROCESSOR

BACKGROUND OF THE INVENTION

Modern microprocessor during operation may generate heat. The heat may be generated from various workloads and may be limited by a maximal operating frequency and a maximal operating voltage. In order to reduce the heat from the microprocessor, various dynamic thermal management (DTM) mechanisms may be used. For example, a dynamic voltage scaling (DVS) mechanism may be used to control a peak power of the microprocessor. However, many of these DTM mechanisms require explicit knowledge on the state of the microprocessor such as, for example, temperature and/or power monitoring.

More particularly, the DVS mechanism may be called when the temperature of the microprocessor exceeds a threshold. For example, the DVS mechanism may decrease the frequency and the voltage to a pre-defined level with some hysteresis when the temperature of the microprocessor exceeds the threshold and may restore the frequency and/or the voltage to their original levels after a predefined time and/or after the temperature of the microprocessor decreases to a desired temperature.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
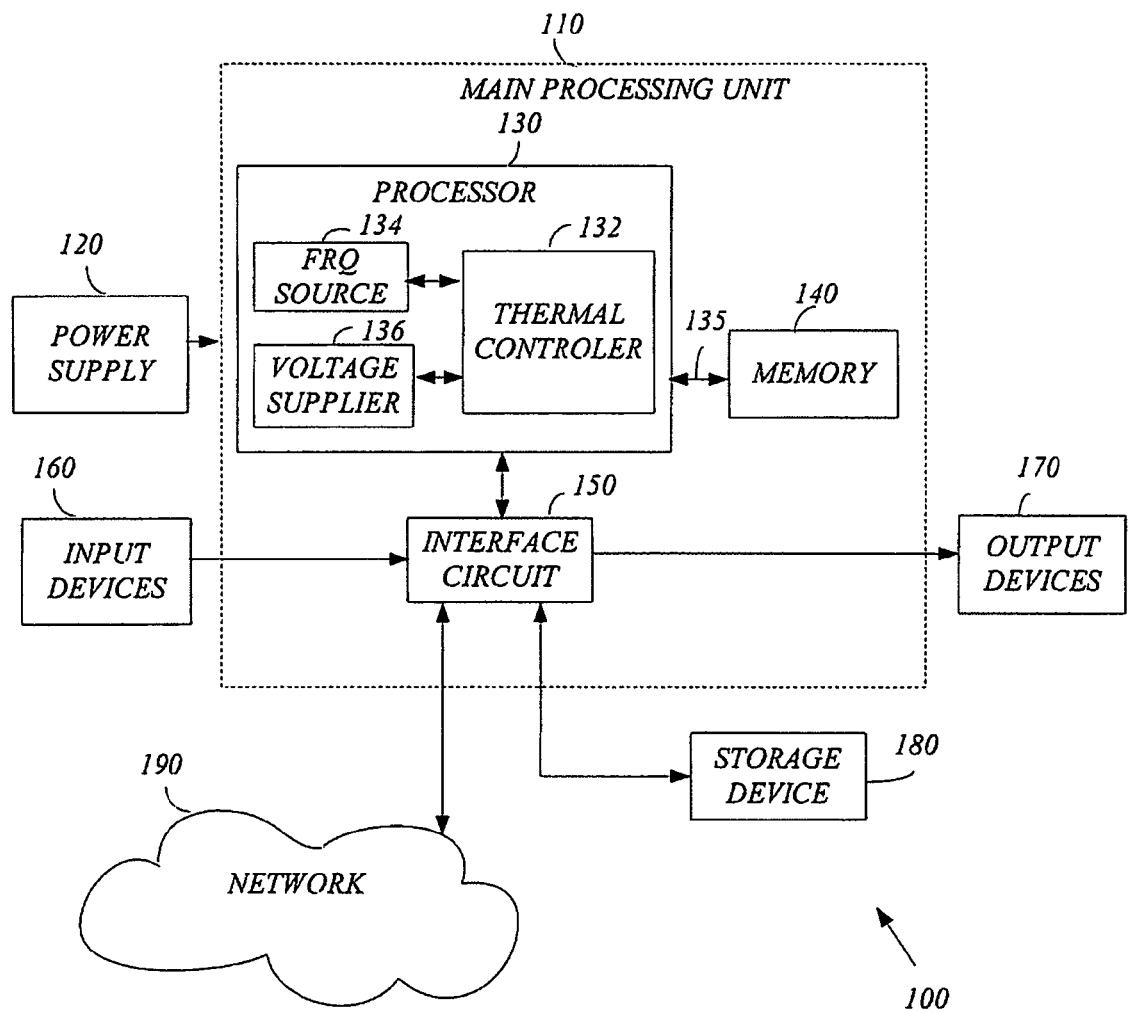
FIG. 1 is a block diagram of processor system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or more instructions.

It should be understood that the present invention may be used in a variety of applications. Although the present invention is not limited in this respect, the circuits and techniques disclosed herein may be used in many apparatuses such as computer systems, processors, central processing unit (CPU), multi-processing unit or the like. Processors intended to be included within the scope of the present invention include, by way of example only, a reduced instruction set computer (RISC), a processor that have a pipeline, a complex instruction set computer (CISC) and the like.

Some embodiments of the invention may be implemented, for example, using a machine-readable medium or article which may store an instruction or a set of instructions that, if executed by a machine (for example, by a multi-processing unit and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone, or any other computing device. According to this exemplary embodiment of the invention, computer system 100 may include a main processing unit 110 powered by a power supply 120. In embodiments of the invention, main processing unit 110 may include a processor 130 coupled by a system interconnect 135 to a memory device 140 and one or more interface circuits 150. For example, the system interconnect 135 may be an address/data bus, if desired. It should be understood that interconnects other than busses may be used to connect processor 130 to memory device 140. For example, one or more dedicated lines and/or a crossbar may be used to connect processor 130 to memory device 140.

According to some embodiments of the invention, processor 130 may include any type of processing unit, such as, for example, CPU, multi-processing unit, a reduced instruction set computer (RISC), a processor that have a pipeline, a complex instruction set computer (CISC), digital signal processor (DSP) and the like. In addition, processor 130 may include any type cache memory, such as, for example, static random access memory (SRAM) and the like. Memory device 140 may include a dynamic random access memory (DRAM), non-volatile memory, or the like. In one example, memory device 140 may store a software program which may be executed by processor 130, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 160 may be connected to interface circuit(s) 150 for entering data and commands into the main processing unit 110. For example, input devices 160 may include a keyboard, mouse, touch screen, track pad, track ball, isopoint, a voice recognition system, and/or the like.

Although the scope of the present invention is not limited in this respect, the output devices 170 may be operably coupled to main processing unit 110 via one or more of the interface circuit(s) 150 and may include one or more displays, printers, speakers, and/or other output devices, if desired. For example, one of the output devices may be a display. The display may be a cathode ray tube (CRTs), liquid crystal displays (LCDs), or any other type of display.

Although the scope of the present invention is not limited in this respect, computer system 100 may include one or more storage devices 180. For example, computer system 100 may include one or more hard drives, one or more compact disks (CD) drive, one or more digital versatile disk drives (DVD), and/or other computer media input/output (I/O) devices, if desired.

Although the scope of the present invention is not limited in this respect, computer system 100 may exchange data with other devices via a connection to a network 190. The network connection may be any type of network connection, such as an Ethernet connection, digital subscriber line (DSL), telephone line, coaxial cable, etc. Network 190 may be any type of network, such as the Internet, a telephone network, a cable network, a wireless network and/or the like.

Although the scope of the present invention is not limited to this embodiment, in this exemplary embodiment of the invention, processor 130 may include a thermal controller 132, a voltage supplier 136 and a frequency (FRQ) source 134. According to some embodiments of the invention, thermal controller 132 may control the temperature of processor 130 by decreasing the power level of the processor 130 to a predefined power level for a predetermined time period. Thermal controller 132 may monitor the temperature of processor 130. For example, if the temperature is at and/or above a threshold, thermal controller 132 may reduce the power of processor 130 for another predetermined time period. Furthermore, thermal controller 132 may increase the power of processor 130 if the temperature of processor 130 may be below the threshold.

According to some embodiments of the invention, thermal controller 132 may control the power of processor 130 by varying the frequency and the voltage of the processor 130. For example, frequency source 134 may include a voltage controlled oscillator (VCO) and voltage supplier 136 may include a variable regulator, if desired. Thermal controller 132 may vary the voltage and/or the frequency of processor 130 by controlling voltage supplier 136 and/or frequency source 134.

Additionally or alternatively, thermal controller 132 may invoke a thermal adjustment mechanism to vary a power level of processor 130 if the temperature of processor 130 may exceed the predetermined temperature level after a predefined time. Thermal controller 132 may invoke another thermal adjustment mechanism to vary a power level of processor 130 if the temperature of the processor 130 may exceed the predetermined temperature level within the predetermined time period after invocation of either thermal adjustment mechanisms. Although the scope of the present invention is not limited in this respect, it should be understood that thermal controller 132 may be implemented in software, in hardware, or in any suitable combination of software and hardware.

Figure 2:
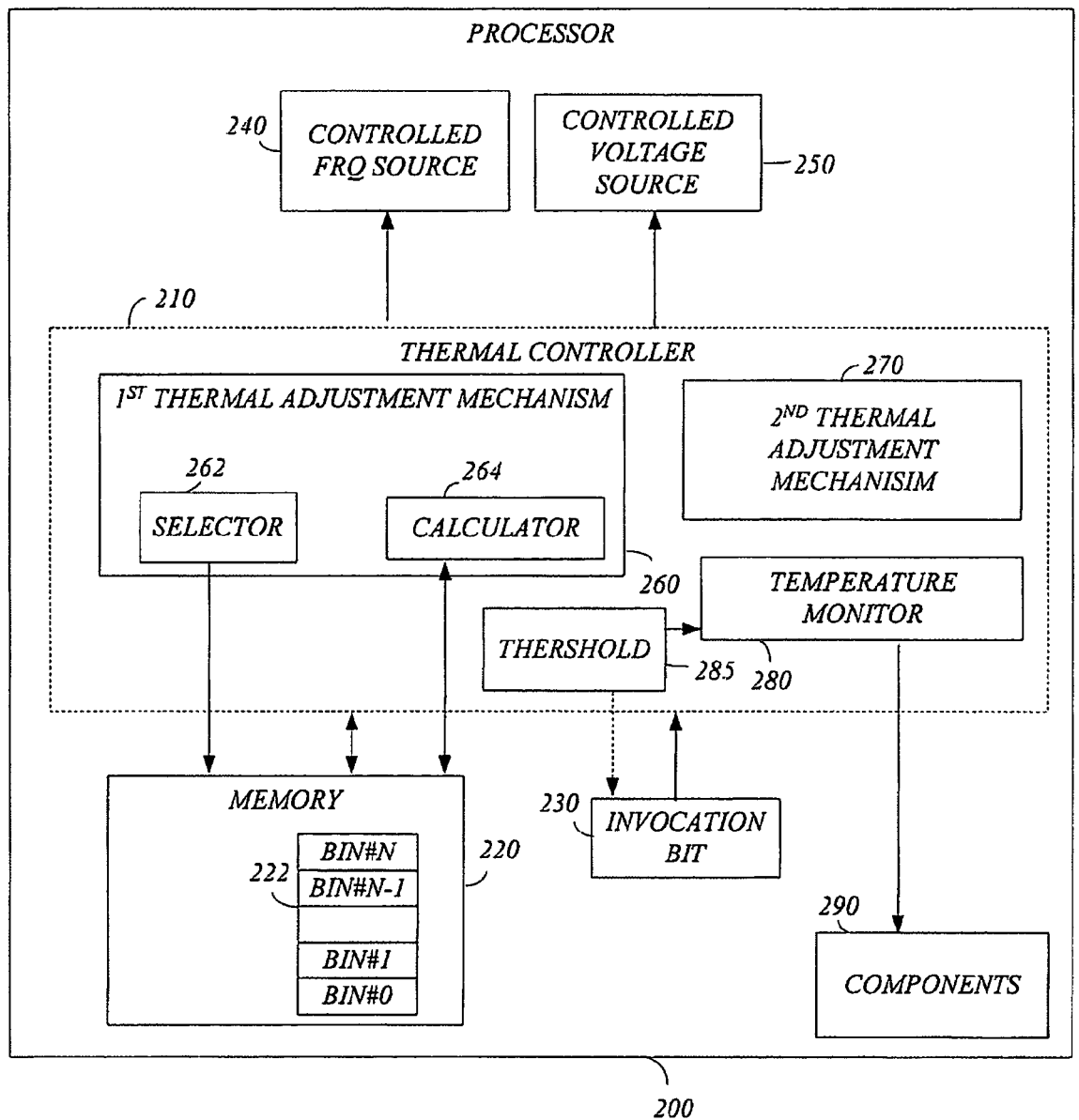
FIG. 2 is a block diagram of a thermal controller according to an exemplary embodiment of the present invention.

Turning to FIG. 2 a block diagram of a processor 200 according to an exemplary embodiment of the invention is shown. Although the scope of the present invention is not limited in this respect, processor 200 may include a thermal controller 210, a memory 220, an invocation bit 230, a controlled frequency source 240 a controlled voltage source 250 and various components 290.

According to this exemplary embodiment of the invention, thermal controller 210 may include a first thermal adjustment mechanism 260, a second thermal adjustment mechanism 270 and a temperature monitor 280. For example, first thermal adjustment mechanisms 260 may include a selector 262 and a calculator 264. It should be understood that in embodiments of the invention, second thermal adjustment mechanism 270 may include at least some of the components of first thermal adjustment mechanism 260, although he scope of the present invention is not limited in this respect.

Additionally or alternatively, memory 220 may include a voltage-frequency table 222 that includes two or more bins, for example, bin#0, bin#1 . . . bin#N−1, bin#N. A bin of bin#0, bin#1 . . . bin#N−1, bin#N may include at least one frequency value and/or at least one voltage value. According to embodiments of the invention, bin#N may include maximum values of frequency and voltage that may be suitable for the operation of processor 200, and bin#0 may include minimum values of voltage and frequency that may be suitable for the operation of processor 200. According to one embodiment of the invention, bin#0 may be set as a lower bound of voltage and/or frequency values and bin#N may be set as an upper bound of voltage and/or frequency values. According to some embodiments, the upper bound may be dynamically adjusted by the first and/or second thermal adjustment mechanisms, although the scope of the present invention is not limited in this respect.

Although the scope of the present invention is not limited in this respect, temperature monitor 280 may monitor the temperature of components 290. For example, if the temperature is above a predetermined threshold, for example, a threshold 285, thermal controller 210 may control the temperature of processor 200 by decreasing the power level of processor 200 to a predetermined power level for a predetermined time period, for example, 1 milli-second. In one other embodiment of the invention, temperature monitor 280 may monitor the temperature of components 290 and thermal controller 210 may vary the power of processor 200 to another predetermine power level for another predetermined time period, e.g., until the temperature of the processor 200 may be below threshold 285.

Although the scope of the present invention is not limited in this respect, according to this exemplary embodiment of the invention, thermal controller 210 may employ two thermal adjustment mechanisms to vary the power level of the processor 200. For example, first thermal adjustment mechanism 260 may vary the power if the temperature of processor 200 exceeds threshold 285, which may be related to a predetermined temperature (e.g. 100° C.), after a predefined time period, and second thermal adjustment mechanism 270 may vary the power level if the temperature of processor 200 exceeds threshold 285 within the predetermined time period after the invocation of the first or second thermal adjustment mechanisms 260, 270.

Although the scope of the present invention is not limited in this respect, thermal controller 210 may vary the power level of processor 200 by using first and second thermal adjustment mechanisms 260, 270 to control frequency source 240 and/or to control voltage source 250. Thermal controller 210 may set controlled frequency source 240 and controlled voltage source 250 according to the values provided by the bins of voltage-frequency table 222, if desired. The invocation of either first or second thermal adjustment mechanisms 260, 270 may be initiated according to the state of invocation bit 230.

More specifically, although the scope of the present invention is not limited in this respect, calculator 264 of first thermal adjustment mechanism 260 may calculate desired values of frequency and voltage and selector 262 may select a bin (e.g. bin#1) from voltage-frequency table 222 that includes values of frequency and voltage that may be substantially equal to the desired values and/or within a certain range of the desired values, to set controlled frequency source 240 and controlled voltage source 250 with those values. In some embodiments of the invention, calculator 264 may truncate the desired values into integer values, if desired. According to this example, the values may be calculated from the operating frequency and voltage values of processor 200 and from the upper bound of the frequency and voltage values that cause processor 200 to increase its temperature. For example, the upper bound may be bin#N–1, if desired Although the scope of the present invention is not limited in this respect, second thermal adjustment mechanism 270 may be invoked when the temperature of the processor may exceed the threshold after the voltage and the frequency have been reduced. Second thermal adjustment mechanism 270 may perform fine tuning to the upper bund of frequency and voltage levels of processor 200. The fine tuning of the upper bound may be done by selecting a bin which includes voltage and frequency values that course the temperature of processor 200 to be below the threshold. In addition, second thermal adjustment mechanism 270 may decrease the frequency and the voltage of processor 200 by setting controlled frequency source 240 and controlled voltage source 250 to values determined from the upper bound of frequency and voltage values according to the temperature level of components 290. In some embodiments of the invention, second thermal adjustment mechanism 270 may increase the frequency and voltage of processor 200 when the temperature of processor 200 decreases to and/or below a predetermined temperature level for a predetermined time period, if desired.

Although the scope of the present invention is not limited in this respect, for the simplicity of the description, only the structure of first thermal mechanism 260 is described in detail. It should be understood that in some embodiments of the invention, second thermal adjustment mechanism 270 may include a structure similar to that of first thermal mechanism 260. Furthermore, it should be understood that first and second thermal adjustment mechanisms 260, 270 may be implemented by hardware, by software or any combination of hardware and software.

Figure 3:
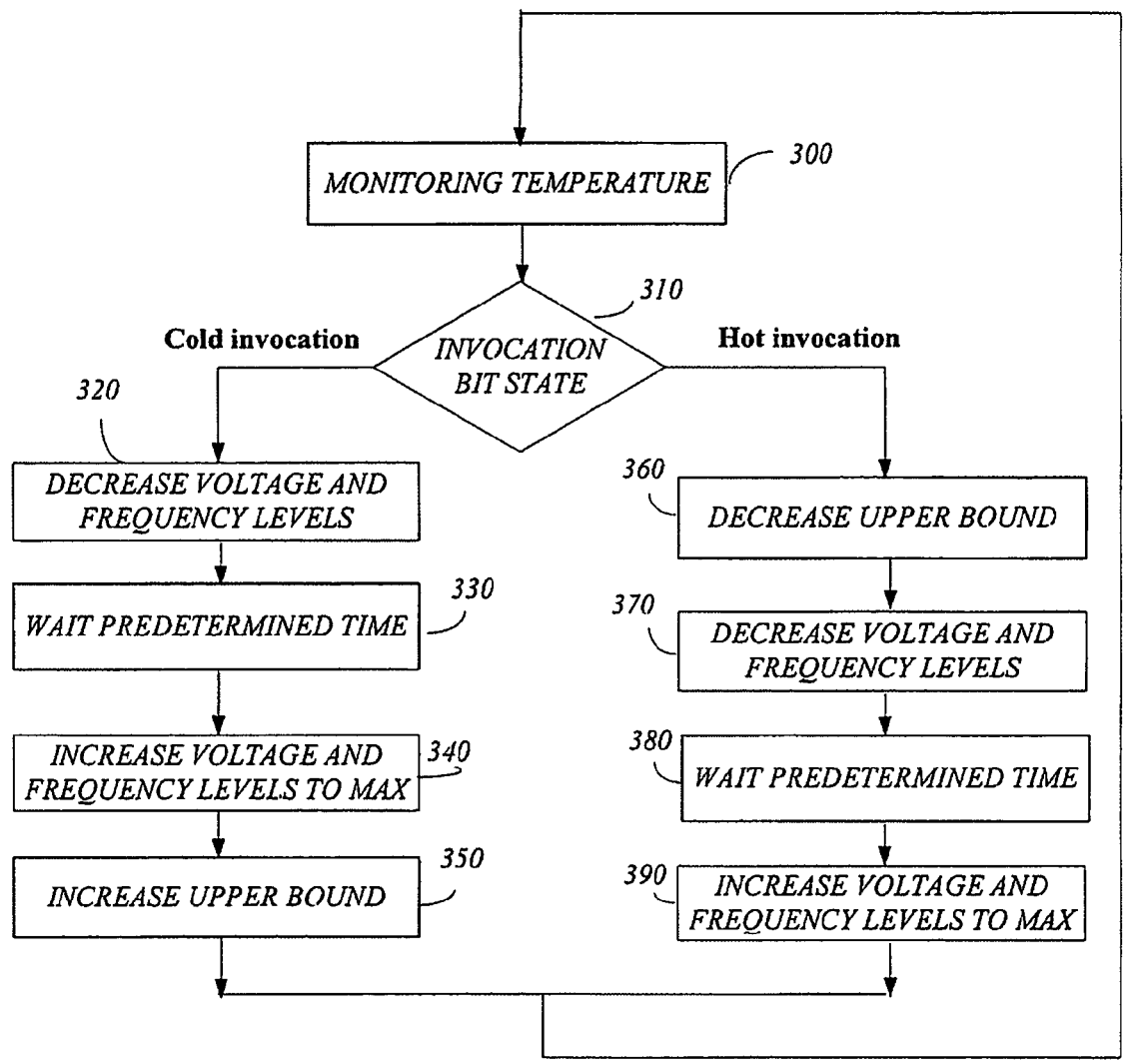
FIG. 3 is a flowchart of a method of thermal controlling of a processor according to exemplary embodiments of the invention.

Turning to FIG. 3, a thermal controlling method of a processor according to an exemplary embodiment of the invention is shown. Although the scope of the present invention is not limited in this respect, the thermal controlling may be done by monitoring a temperature of components of a processor (text block 300) and updating a state of an invocation bit (e.g. invocation bit 230).

According to some embodiments of the invention, the state of invocation bit 230 may indicate to invoke a first thermal adjustment mechanism or to invoke a second thermal adjustment mechanism (text block 310). For example, invocation of the first thermal adjustment mechanism may be referred as "cold invocation" and invocation of the second thermal adjustment mechanism may be referred as "hot invocation".

Although the scope of the present invention is not limited in this respect, the first thermal adjustment mechanism may decrease the voltage and/or frequency of processor 200 from their previous values (text block 320). For example, the decreased frequency and/or voltage levels may be the average of the previous values and the upper bound values. In some embodiments of the invention, the voltage and frequency values may be provided from a selected bin of voltage-frequency table 222.

Although the scope of the present invention is not limited in this respect, the processor may operate with this set of frequency and voltage values for a predetermined time period (text block 330) and, if during this time period the temperature of processor 200 does not exceed the threshold, the frequency and/or voltage levels may be increased up to their maximum levels, if desired (text block 340). For example, the levels may be increased by two bins of the voltage-frequency table 222. In some embodiments of the invention, according to statistics that may indicate that processor 200 may operate properly with higher voltage and frequency values, the upper bound may be increased (text box 350), although the scope of the present invention is not limited in this respect.

Referring now to "hot invocation" text blocks 360-390, according to some embodiment of the invention, if after a predetermined time period the temperature exceeds a desired temperature threshold, the state of invocation bit 230 may be changed and may trigger an invocation of second thermal adjustment mechanism 270. According to this exemplary embodiments of the invention, the second thermal adjustment mechanism may decrease the voltage and frequency threshold (text block 360) and may decrease the voltage and frequency values (text block 370). For example, the second thermal adjustment mechanism may select the values from a bin which may be two bins below the current bin, if desired. The second thermal adjustment mechanism may wait a predetermined time period (text block 380) to monitor the temperature and may adjust the upper bound, and may repeat the operation until the temperature may drop below the temperature threshold. Second thermal adjustment mechanism 270 may increase the voltage and frequency levels to their maximal value if the temperature is below the threshold after the predetermined time period, for example 1 Millisecond (msec), 2 msec or the like (text block 390).

Although the scope of the present invention is not limited in this respect, the first and second thermal adjustment mechanisms may employ other methods to reduce the temperature of processor 200; for example, periodically enabling and/or disabling one or more components of processor 200.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   invoking a first thermal adjustment if a temperature of a processor exceeds a threshold temperature level, said first thermal adjustment comprising
   calculating a first set of desired values of frequency and voltage of the processor;
   selecting a first bin of frequency and voltage values from a voltage-frequency table having two or more bins, wherein each bin includes at least one voltage value and at least one frequency value; and
   decreasing a power of the processor to a first power level for a first predetermined time period, said first power level based on said first bin of frequency and voltage values;
   increasing the frequency and voltage levels to an upper bound of frequency and voltage values for a second predetermined time period if the temperature of the processor does not exceed the threshold temperature level during the first predetermined time period, wherein the upper bound of values is included in a second bin of the voltage-frequency table;
   increasing the upper bound of frequency and voltage values to a set of values included in a third bin of the voltage-frequency table if the temperature of the processor does not exceed the threshold temperature during the second predetermined time period; and
   invoking a second thermal adjustment if the temperature of the processor exceeds the threshold temperature level within a third predetermined time period after the invocation of the first or second thermal adjustments, said second thermal adjustment comprising
   calculating a second set of desired values of frequency and voltage of the processor;
   selecting a fourth bin of frequency and voltage values from the voltage-frequency table; and
   decreasing the power of the processor to a second power level for the third predetermined time period, said second power level based on said fourth bin of frequency and voltage values.

2. The method of claim 1, further comprising:
   monitoring a state of an invocation bit; and
   invoking the first or second thermal adjustment based on the state of the invocation bit.

3. The method of claim 1, wherein the first and second thermal adjustments control a voltage and a frequency of the processor.

4. The method of claim 1, wherein the first and second thermal adjustments control the power of the processor by varying a frequency of the processor.

5. The method of claim 1, wherein the first and second thermal adjustments periodically enable and disable a component of the processor.

6. The method of claim 1, further comprising:
   adjusting a lower bound of voltage and frequency by setting a fifth bin of the voltage-frequency table as the lower bound.

7. The method of claim 6, wherein the first set of desired values of said first thermal adjustment are calculated from an operating frequency and an operating voltage of the processor and from the frequency and the voltage of the upper bound of the voltage frequency table.

8. The method of claim 6, wherein adjusting the upper and the lower bound is based on the temperature of the processor.

9. The method of claim 6, wherein the second thermal adjustment further comprises:
   decreasing the frequency and the voltage of the processor to values that are determined from the upper bound of the voltage-frequency table based on a temperature level of the processor; and
   resetting the upper bound of the voltage-frequency table based on the decreased voltage and frequency values.

10. The method of claim 9, wherein the second thermal adjustment further comprises:
    increasing the frequency and the voltage of the processor when the temperature of the processor has decreased to a predetermined temperature for a fourth predetermined time period.

11. A processor comprising:
    a temperature monitor to monitor a temperature of the processor; and
    a thermal controller, operatively coupled to the temperature monitor, to control the temperature of the processor, said thermal controller including at least;
    a first thermal adjustment mechanism to perform the following steps if the temperature of the processor exceeds a threshold temperature level;
    calculating a first set of desired values of frequency and voltage of the processor;
    selecting a first bin of frequency and voltage values from a voltage-frequency table having two or more bins, wherein each bin includes at least one voltage value and at least one frequency value;
    decreasing a power level of the processor to a first power level for a first predetermined time period, said power level based on said first bin of frequency and voltage values;
    increasing the frequency and voltage levels to an upper bound of frequency and voltage values for a second predetermined time period, the upper bound of values included in a second bin of the voltage-frequency table if the temperature of the processor does not exceed the threshold temperature level during the first predetermined time period; and
    increasing the upper bound of frequency and voltage values to a set of values included in a third bin of the voltage-frequency table if the temperature of the processor does not exceed the threshold temperature during the second predetermined time period; and
    a second thermal adjustment mechanism to perform the following steps if the temperature of the processor exceeds the threshold level within a third predetermined time period after invocation of the first or second thermal adjustments;
    calculating a second set of desired values of frequency and of voltage of the processor;

selecting a fourth bin of frequency and voltage values from the voltage-frequency table; and decreasing the power of the processor to a second power level for the third predetermined time period, said second power level based on said fourth bin of frequency and voltage values.

12. The processor of claim 11, further comprising:

a controlled frequency source to set the frequency of the processor.

13. The processor of claim 11, further comprising:

a controlled voltage source to set the voltage of the processor according to the temperature of the processor.

14. The processor of claim 11, further comprising:

a memory to store the voltage-frequency table that includes two or more bins, wherein a last bin of the voltage-frequency table includes a lower bound of frequency and voltage values.

15. The processor of claim 14, wherein a bin of the voltage-frequency table further comprises a voltage value.

16. The processor of claim 14, wherein the first thermal adjustment mechanism comprises:

a calculator to calculate the first set of desired values of frequency and voltage, wherein the desired values are calculated from both operating frequency and voltage values and from the upper bound of the voltage-frequency table, the upper bound corresponding to the frequency and voltage values that cause the temperature of the processor to increase; and a selector to select a bin from the voltage-frequency table that includes at least frequency and voltage values which are within a range of the first set of desired values of frequency and voltage.

17. The processor of claim 14, wherein the second thermal adjustment mechanism is configured to perform the steps of:

setting an upper bound of the voltage-frequency table; and decreasing the frequency and the voltage of the processor to values determined from the upper bound of the voltage-frequency table based on the temperature of the processor.

18. The processor of claim 17, wherein the second thermal adjustment mechanism is further configured to perform the step of:

increasing the frequency and the voltage of the processor when the temperature of the processor decreases to a predetermined temperature for the third predetermined time period.

19. The processor of claim 11, wherein the thermal controller is configured to invoke the first thermal adjustment mechanism and the second thermal adjustment mechanism according to a state of an invocation bit.

20. A computer system comprising:

a processor comprising:

a temperature monitor to monitor a temperature of the processor; and a thermal controller, operatively coupled to the temperature monitor, to control the temperature of the processor, said thermal controller including at least;

a first thermal adjustment mechanism to perform the following steps if the temperature of the processor exceeds a threshold temperature level;

calculating a first set of desired values of frequency and of voltage of the processor;

selecting a first bin of frequency and voltage values from a voltage-frequency table having two or more bins, wherein each bin includes at least one voltage value and at least one frequency value;

decreasing a power of the processor to a first power level for a first predetermined time period, said power level based on said first bin of frequency and voltage values;

increasing the frequency and voltage levels to an upper bound of frequency and voltage values for a second predetermined time period, the upper bound of values included in a second bin of the voltage-frequency table if the temperature of the processor does not exceed the threshold temperature level during the first predetermined time period; and increasing the upper bound of frequency and voltage values to a set of values included in a third bin of the voltage-frequency table if the temperature of the processor does not exceed the threshold temperature during the second predetermined time period; and a second thermal adjustment mechanism to perform the following steps if the temperature of the processor exceeds the threshold level within a third predetermined time period after invocation of the first or second thermal adjustments;

calculating a second set of desired values of frequency and voltage of the processor;

selecting a fourth bin of frequency and voltage values from the voltage-frequency table; and decreasing the power of the processor to a second power level for the third predetermined time period, said second power level based on said fourth bin of frequency and voltage values.

21. The computer system of claim 20, further comprising:

a memory to store the voltage-frequency table that includes two or more bins wherein, a last bin of the voltage-frequency table includes a lower bound of frequency and voltage values.

22. The computer system of claim 21, wherein the first thermal adjustment mechanism comprises:

a calculator to calculate the first set of desired values of frequency and voltage, wherein the desired values are calculated from both operating frequency and voltage values and from an upper bound of the voltage-frequency table, the upper bound corresponding to the frequency and voltage values that cause the temperature of the processor to increase; and a selector to select a bin from the voltage-frequency table that includes at least frequency and voltage values which are within a range of the first set of desired values of frequency and voltage.

23. The computer system of claim 20, wherein the second thermal adjustment mechanism is configured to perform the steps of:

setting an upper bound of the voltage-frequency table; and decreasing the frequency and the voltage of the processor to values determined from the upper bound of the voltage-frequency table based on the temperature of the processor.

24. The computer system of claim 23, wherein the second thermal adjustment mechanism is further configured to perform the step of;

increasing the frequency and the voltage of the processor when the temperature of the processor decreases to a predetermined temperature for the third predetermined time period.

25. An article comprising: a storage medium, having stored thereon instructions, that when executed, result in:

invoking a first thermal adjustment if a temperature of a processor exceeds a threshold temperature level, said first thermal adjustment comprising calculating a first set of desired values of frequency and voltage of the processor;

selecting a first bin of frequency and voltage values from a voltage-frequency table having two or more bins, wherein each bin includes at least one voltage value and at least one frequency value; and decreasing a power of the processor to a first power level for a first predetermined time period, said first power level based on said first bin of frequency and voltage values;

increasing the frequency and voltage levels to an upper bound of frequency and voltage values for a second predetermined time period if the temperature of the processor does not exceed the threshold temperature level during the first predetermined time period, wherein the upper bound of values is included in a second bin of the voltage-frequency table;

increasing the upper bound of frequency and voltage values to a set of values included in a third bin of the voltage-frequency table if the temperature of the processor does not exceed the threshold temperature during the second predetermined time period; and invoking a second thermal adjustment if the temperature of the processor exceeds the threshold temperature level within a third predetermined time period after the invocation of the first or second thermal adjustments, said second thermal adjustment comprising calculating a second set of desired values of frequency and voltage of the processor;

selecting a fourth bin of frequency and voltage values from the voltage-frequency table; and decreasing the power of the processor to a second power level for the third predetermined time period, said second power level based on said fourth bin of frequency and voltage values.

26. The article of claim 25, wherein the instructions, that when executed, result in:

monitoring a state of an invocation bit; and invoking the first or second thermal adjustment based on the state of the invocation bit.

27. The article of claim 25, wherein the instructions when executed, result in;

the first and second thermal adjustments controlling the power of the processor by varying a frequency of the processor or by varying both the frequency and a voltage of the processor.

28. The article of claim 25, wherein the instructions, that when executed, result in;

adjusting a lower bound of voltage and frequency by setting a fifth bin of the voltage-frequency table as the lower bound.

29. The article of claim 28, wherein the first set of desired values of said first thermal adjustment are calculated from an operating frequency and an operating voltage of the processor and from the frequency and the voltage of the upper bound of the voltage frequency table.

30. The article of claim 28, wherein the second thermal adjustment further comprises:

decreasing the frequency and the voltage of the processor to values that are determined from the upper bound of voltage-frequency table based on a temperature level of the processor; and resetting the upper bound of the voltage-frequency table based on the decreased voltage and frequency values.

31. The article of claim 30, wherein the second thermal adjustment further comprises:

increasing the frequency and the voltage of the processor when the temperature of the processor has decreased to a predetermined temperature level for a fourth predetermined time period.

* * * * *